(12) United States Patent
Hamilton, II et al.

(10) Patent No.: US 8,527,430 B2
(45) Date of Patent: *Sep. 3, 2013

(54) ALLOCATING VIRTUAL UNIVERSE CUSTOMER SERVICE

(75) Inventors: Rick A. Hamilton, II, Charlottesville, VA (US); Brian M. O'Connell, Cary, NC (US); Clifford A. Pickover, Yorktown Heights, NY (US); Anne R. Sand, Peyton, CO (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,150

(22) Filed: Aug. 28, 2012

(65) Prior Publication Data

US 2012/0323736 A1 Dec. 20, 2012

Related U.S. Application Data

(63) Continuation of application No. 12/202,649, filed on Sep. 2, 2008, now Pat. No. 8,296,246.

(51) Int. Cl.
*G06Q 30/00* (2012.01)
(52) U.S. Cl.
USPC .......... 705/346; 705/7.14; 705/27.2; 705/319
(58) Field of Classification Search
USPC ............... 705/27.2, 7.14, 319, 346
See application file for complete search history.

(56) References Cited

U.S. PATENT DOCUMENTS 5,956,039 A 9/1999 Woods et al.
6,032,129 A 2/2000 Greef et al.
(Continued)

FOREIGN PATENT DOCUMENTS

WO 2006124113 A2 3/2006

OTHER PUBLICATIONS

Lee, et al., A web DSS approach to building an intelligent internet shopping mall by integrating virtual reality and avatar, Expert Systems With Applications, vol. 28 No. 2, Feb. 2005, pp. 333-346.*

(Continued)

*Primary Examiner* — Daniel Vetter
(74) *Attorney, Agent, or Firm* — Patrick J. Daugherty; Driggs, Hogg, Daugherty & Del Zoppo Co., LPA (57) ABSTRACT

Virtual universe customer service representatives are cloned and assigned as a function of observing customer behavior, retrieving historical data and creating a customer profile. Preferential subavatar assignment parameters are determined for a customer as a function of the customer profile, choosing a subavatar from a plurality of subavatars as a function of a correlation of a subavatar performance characteristic with the preferential subavatar assignment parameter and a store objective, and the clone is populated with the chosen subavatar. Choosing a subavatar may comprise preferentially rating subavatars and determining an appropriateness threshold as a function of the subavatar assignment parameter, the performance characteristics and the store objective. Some embodiments reset a threshold in response to time-in-queue or to repetitively observing customer behavior, retrieving customer data, determining a subavatar assignment parameter and choosing a highest-rated available subavatar meeting a revised threshold. Subavatars may comprise automated, customer service representative-controlled and jointly-controlled subavatars.

22 Claims, 3 Drawing Sheets

(56) References Cited

U.S. PATENT DOCUMENTS

| | | |
|---|---|---|
| 6,329,986 B1 | 12/2001 | Cheng |
| 6,381,583 B1 | 4/2002 | Kenney |
| 6,396,509 B1 | 5/2002 | Cheng |
| 6,980,962 B1 | 12/2005 | Arganbright et al. |
| 7,210,104 B2 | 4/2007 | Nakagawa et al. |
| 2002/0113809 A1 | 8/2002 | Akazawa et al. |
| 2003/0004744 A1 | 1/2003 | Greene et al. |
| 2003/0187672 A1 | 10/2003 | Gibson et al. |
| 2004/0153378 A1 | 8/2004 | Perkowski |
| 2005/0177463 A1 | 8/2005 | Crutchfield et al. |
| 2006/0182261 A1 | 8/2006 | Grass et al. |
| 2006/0184355 A1 | 8/2006 | Ballin et al. |
| 2006/0218032 A1 | 9/2006 | Patrick et al. |
| 2008/0020814 A1 | 1/2008 | Kernene |
| 2008/0091692 A1 | 4/2008 | Keith et al. |
| 2008/0120558 A1 | 5/2008 | Nathan et al. |
| 2008/0221892 A1 | 9/2008 | Nathan et al. |
| 2009/0017916 A1 | 1/2009 | Blanchard et al. |
| 2009/0165090 A1 | 6/2009 | Glasgow |
| 2009/0216691 A1 | 8/2009 | Borzestowski et al. |
| 2009/0271205 A1 | 10/2009 | Finn et al. |
| 2009/0276704 A1 | 11/2009 | Finn et al. |
| 2009/0285483 A1 | 11/2009 | Guven et al. |
| 2009/0307620 A1 | 12/2009 | Hamilton et al. |
| 2010/0169444 A1 | 7/2010 | Lingafelt et al. |

OTHER PUBLICATIONS

Castronova, Virtual Worlds: A First-Hand Account of Market and Society on the Cyberian Frontier, CESifo Working Paper No. 618, Dec. 2001.
Cho, et al., The Impact of E-Services Failures and Customer Complaints on Electronic Commerce Customer Relationship Management, J. Consumer Satisfaction, vol. 16, 2003, pp. 106-118.
Wood, et al., Personalisation of Online Avatars: Is the Messenger as Important as the Message?, Int'l. J. Internet Marketing & Advertising, vol. 2, No. 1, Feb. 2005, pp. 143-161.
Garcia, Is the Customer Service Avatar the Next Paperclip?, serviceunplugged.com, WebArchive dated Mar. 26, 2007.
Cohen, Outsourcing Customer Service to Second Life, Linuxinsider, Aug. 24, 2007.
U.S. Appl. No. 12/202,649, filed Sep. 2, 2008.
Non-Final Office Action (Mail Date Oct. 4, 2011) for U.S. Appl. No. 12/202,649, filed Sep. 2, 2008.
Response (File Date Jan. 3, 2012) to Non-Final Office Action (Mail Date Oct. 4, 2011) for U.S. Appl. No. 12/202,649, filed Sep. 2, 2008.
Final Office Action (Mail Date Mar. 28, 2012) for U.S. Appl. No. 12/202,649, filed Sep. 2, 2008.
Response (File Date May 25, 2012) to Final Office Action (Mail Date Mar. 28, 2012) for U.S. Appl. No. 12/202,649, filed Sep. 2, 2008.
Notice of Allowance (Mail Date Jun. 19, 2012) for U.S. Appl. No. 12/202,649, filed Sep. 2, 2008.

\* cited by examiner

TABLE 1

| Historical Data Rating | Values | Rating | Weight | Factor |
|---|---|---|---|---|
| Notoriety in real life | 1-10 | 4 | 0.6 | 2.4 |
| Previous purchases | < $1,000 = 1<br>$1,000-$5,000 = 2<br>>$5,000 = 3 | 2 | 0.4 | 0.8 |
| In preferred geography? | 0 or 1 | 1 | 0.2 | 0.2 |
| Total | | | | 3.4 |

TABLE 2

| Real-time Data Rating | Values | Rating | Weight | Factor |
|---|---|---|---|---|
| Engaged in shopping? | 1-10 | 6 | 0.3 | 1.8 |
| Smoothness of movement | 1-10 | 2 | 0.4 | 0.8 |
| Avatar Search Hit Frequency | < 5 = 1<br>6-50 = 2<br>>50 = 3 | 3 | 0.1 | 0.3 |
| Total | | | | 2.9 |

TABLE 3

| Predicted transaction values | Value | Rating |
|---|---|---|
| Likely $ value of transaction | Dollars | $20,000 |
| Complexity of transaction | 1-10 | 4 |

TABLE 4

| CSR Profile | Value | Description |
|---|---|---|
| Max # of simultaneous customers | 5 | This CSR can only handle 5 customers at once |
| Max complexity | 6 | This CSR is new, send complex sales to other senior reps |
| Max customer rating | 4 | Don't give the most important customers to this rep |
| Historical avg time to service | 4 minutes | Consider relative to other CSR's if relevant to transaction |
| # on queue currently | 2 | This CSR can take 3 new customers |

TABLE 5

| |
|---|
| 5.1 For each CSR ensure # of customers being served does not exceed simul. max |
| 5.2 For CSRs under simul. max ensure customer and transaction characteristics do not exceed max values |
| 5.3 If no CSRs have bandwidth and qualify, start timer; assign to lesser qualified rep. after X minutes. |
| 5.4 If CSRs have bandwidth and qualify for this customer, select most appropriate CSR & add to queue |
| 5.5 If appropriate CSR found and available, chosen CSR removes customer from queue and provides service |
| 5.6 If no available and qualified CSRs, add customer to master queue and return to Table 2 rating process |

ALLOCATING VIRTUAL UNIVERSE CUSTOMER SERVICE

CROSS-REFERENCE TO RELATED APPLICATIONS

This application is a continuation of U.S. application Ser. No. 12/202,649, filed Sep. 2, 2008.

FIELD OF THE INVENTION

The present invention generally relates to managing customer service within a Virtual Universe (VU) environment, and more particularly to methods, systems, and program products for increasing customer satisfaction or revenue in a Virtual Universe by load balancing customer service representatives in response to customer, service representative and provider parameters or objectives.

BACKGROUND OF THE INVENTION

A Virtual Universe (VU) is a computer-based simulated environment that a user may traverse, inhabit, and interact with other users within through the use of an avatar, a graphical representation of the user often taking the form of a cartoon-like human though any graphic image may be utilized. Many VU's are represented using three dimensional (3-D) graphics and landscapes and are populated by many thousands of users or "residents," often resembling the real world in terms of physics, houses, and landscapes. Other terms for VU's include metaverses, massively multiplayer online games, "3-D Internet" and Virtual World.

VU assets, avatars, the VU environment, and anything presented to a user as visual information comprise Universally Unique Identifiers (UUID's) tied to geometric data distributed to users as textual coordinates, textures distributed to users as graphics files (in some examples as a JPEG2000 file), and effects data rendered by the user's client computer according to the user's preferences and user's computer system device capabilities. Many VU's are represented using three dimensional (3-D) graphics and landscapes and are populated by many thousands of users or "residents," often resembling the real world or fantasy/fictional worlds in terms of physics, houses, landscapes and in interpersonal communications with other users. Examples of large robust VU's and massively multiplayer online games include SECOND LIFE® (SL) (SECOND LIFE is a trademark of Linden Research, Inc. in the United States and/or other countries), Entropia Universe™ (ENTROPIA UNIVERSE is a registered trademark of MindArk PE AB in the United States, other countries, or both), The Sims Online™ (THE SIMS ONLINE is a trademark of Electronic Arts, Inc in the United States, other countries, or both), and There™ (THERE is a trademark of Makena Technologies, Inc. in the United States, other countries, or both). Such examples render and display detailed, large and complex graphic environments within which users may travel and participate as if a character in an expressionistic or fantastical fictional world or within a somewhat realistic or representational approximation of real life (e.g. Second Life®).

In a VU, a user creates an agent which functions as the user's account, and upon which the user may build an avatar tied to an inventory of assets the user owns in the VU and associated with the agent. VU's are also commonly defined with respect to VU regions, virtual areas of land within the VU typically residing on a single server. VU assets, avatars, the VU environment, and anything presented to a user as visual information comprise Universally Unique Identifiers (UUID's) tied to geometric data distributed to users as textual coordinates), textures distributed to users as graphics files (for example as a JPEG2000 file), and effects data rendered by the user's client computer according to the user's preferences and user's computer system device capabilities.

Service providers and corporate entities such as governmental and non-governmental organizations, corporations and non-profit associations generally establish a presence and engage users in various activities by acquiring a fixed virtual physical location within the VU, generically sometimes referred to as a "store" and which may refer to any physical space acquired and monitored for user avatar occupation. Accordingly, commercial entities such as conventional retailers are increasing opening stores in VU's in order to pursue retail sales and other commercial activities, and wherein customer user avatars entering the store are greeted and engaged by an avatar agent of the store owner, manager, salesperson or other customer service representative (CSR). In some respects, VU stores offer a shopping experience similar to a real-life store experience, with a customer avatar engaging in extended real-time conversations, either through chat or other interactive text applications or even through real-time spoken conversations. Thus, in one aspect, the VU shopping experience may offer advantages over other types of on-line shopping options, which generally offer much more limited CSR representative engagement, for example during a retail transaction process.

However, in another aspect, the CSR avatar is only representative of a real-life CSR, and in some cases may not actually represent a human or the undivided attention of a human. More particularly, any given CSR avatar may or may not be actively managed or even representative of a human operator; a CSR avatar may in fact represent an automated computer dialog entity or "bot" instead of a human CSR. Bots are software applications that run automated tasks, often performing structurally repetitive tasks at a much higher rate than would be possible for a human alone; for example, a bot may comprise an automated script that fetches, analyses and files information from web servers at many times the speed of a human. Bots may be implemented to emulate human activity, for example chat bots, are also used as organization and content access applications for media delivery, and still further applications will be apparent to one skilled in the art.

In one example, a human CSR represented by the avatar may be engaging multiple users through multiple avatars, and thus any given interaction with the CSR avatar may be either an automated (bot) or human-attended interaction. Although bot CSR avatar agents may be acceptable to some customers, others may object to interacting with a bot and terminate an engagement when the automated nature of the bot becomes apparent, and in particular if a bot cannot respond adequately to the customer or otherwise evidence the characteristics, attentiveness or perform the functions expected of a human CSR.

Problems also arise in meeting customer service demands in a VU environment. For example, avatar customers in a VU store may outnumber available CSR avatars and/or supporting human operators, and delays in giving service or meaningful attention to some users in a crowded store may result in some users leaving the store before they have been engaged, in a commercial or retail context perhaps including the most important or profitable of the present customers and thus resulting directly in loss of profits or business opportunities. Prior art VU management does not offer adequate solutions: computer systems and applications are generally configured to process incoming data or tasks through first-in first-out (FIFO) or round-robin methods and systems, thus selecting and giving immediate focus to a task or customer avatar on a random or time-dependent basis. This risks focusing limited resources on lower priority customers at the expense of other higher-need or higher value customers who may leave the store without appropriate service within a timely manner.

SUMMARY OF THE INVENTION

Methods, services, programs products comprising code, devices and systems are provided for allocating customer service representatives in a virtual universe, wherein a virtual universe store comprises an original customer service representative avatar and a plurality of subavatars, each of the subavatars having a capability of the original avatar and a divergent performance characteristic. In response to a customer avatar entering the virtual universe store and an unavailability of the original customer service representative avatar, the original customer service representative avatar is cloned and assigned to the customer avatar. Behavior of the customer avatar is observed and historical customer data retrieved from a data store, further creating a customer profile from the observed behavior and the retrieved historical customer data and determining a preferential subavatar assignment parameter for the customer as a function of the customer profile. A subavatar is chosen from the plurality of subavatars as a function of a correlation of the performance characteristic of the chosen subavatar with the preferential subavatar assignment parameter and a store objective, and the assigned clone is populated with the chosen subavatar, the populated clone engaging the customer avatar.

In another aspect, methods are provided for producing computer executable program code, storing the produced program code on a computer readable medium, and providing the program code to be deployed to and executed on a computer system thereby providing a computer infrastructure being operable to perform one or more of the method and/or process elements described above, for example by a service provider who offers to implement, deploy, and/or perform functions for others. Still further, an article of manufacture comprising a computer usable medium having the computer readable program embodied in said medium may be provided. Such program codes comprise instructions which, when executed on the computer system, cause a computer system to perform one or more of the method and/or process elements described above. Moreover, systems, articles and programmable devices configured for performing one or more of the method and/or process elements of the present invention, for example as described above, are also provided.

BRIEF DESCRIPTION OF THE DRAWINGS

These and other features of this invention will be more readily understood from the following detailed description of the various aspects of the invention taken in conjunction with the accompanying drawings in which:

FIG. 3 provides tabular illustrations of an application of a load-balancing algorithmic system or process according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections: I. General Description; and II. Computerized Implementation.

I. General Description

Figure 1:
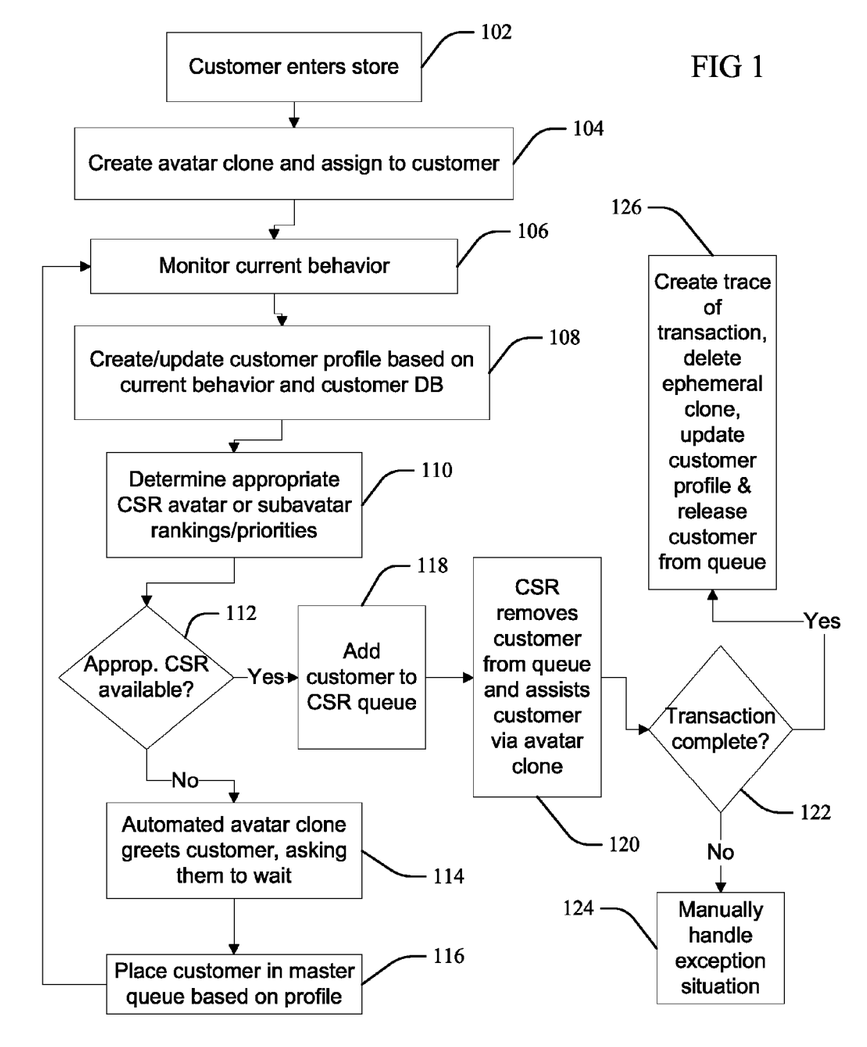
FIG. 1 is a flow chart diagram illustrating a process for allocating customer service representatives in response to customer and service representative parameters according to the present invention.

FIG. 1 illustrates a process for allocating VU customer service representatives in response to customer, transaction and service representative parameters according to the present invention. At 102 a customer avatar enters a VU store or other commercial provider region. If a store has available or unoccupied CSRs then one may be assigned to the customer, the CSR's avatar generally greeting and engaging the customer ("Can I help you?"). However, if no human CSR's are available, the number of customer avatars in the store outnumber available CSR's or it is otherwise desirable to manage CSR avatar assignments then according to the present invention at 104 a primary CSR avatar is cloned into a subavatar and assigned to the customer by a store provider CSR allocation application operating on a computer system or other programmable device as provided by the present invention.

The customer avatar interacts one-on-one with the cloned CSR subavatar dedicated to that customer, which responds directly to the customer avatar. Avatars and subavatars may have divergent abilities and capacities, thus the cloned subavatar may provide one or more capabilities of an original or human-attended avatar, including following the customer to an item, manipulating the item and answering specific questions; or it may be restricted, for example in their movement (e.g. they may not leave the store) or sales authority (e.g. they may not sell an item at more than 20% discount). In one embodiment, three types of CSR Subavatar clones are provided; type-one is an automated artificial agent not controlled by a human; type-two is controlled by a primary avatar salesperson, which is itself controlled by a human; and type-3 is jointly controlled by the human-controlled primary avatar salesperson and the automated artificial agent, wherein some routines are handled by the artificial agent.

In one advantage of the present invention, avatars or subavatars with divergent performance characteristics may be selected and assigned to customers as a function of customer and/or store characteristics, needs or other parameters. For example, with respect to the type-1, type-2 and type-3 subavatars described above, higher priority or need customers may be assigned a human-monitored type-2 subavatar, whereas customers who appear to be only browsing and not actively shopping may be assigned an automated or bot type-1 Subavatar. Accordingly, the process illustrated in FIG. 1 monitors and observes the current status and aspects of the behavior of the customer as well as his avatar at 106, creates or updates a customer profile in response to the observed status and behavior and to any historical real-life or VU customer data stored and associated with the customer at 108 and then determines preferential subavatar assignment parameter for the customer as a function of the customer profile at 110.

More particularly, at 110 the determined preferential subavatar assignment parameter is compared to the performance characteristics of each of the subavatars available for the store at 112, and one or more of the subavatars having performance characteristics correlated to or otherwise meeting the determined preferential subavatar assignment parameter is/are identified. If an appropriate CSR subavatar is not available at 112, then the customer is greeted (for example by an automated greeter clone routine) and informed of a delay in service or asked to wait for a next available appropriate CSR subavatar at 114, the customer placed in a master store customer queue for the next available appropriate subavatar assignment at 116. While in the master queue, the customer profile is continuously or periodically updated and the preferential subavatar assignment parameter re-determined in response to each profile update by looping back through the process steps 106 108 110 112 114 116, wherein each iteration of attempting to match the customer with a preferred CSR subavatar assignment at 112 is a function of a preferential subavatar assignment parameter re-determination at 110. This looping and updating enables recalculation of the preferential subavatar assignment parameter determination at 110 and assignment at 112 responsive to changes in customer behavior or other parameters; for example, if a customer avatar indicates impatience or begins to leave the store, or elapsed time in the master queue reaches one or more thresholds, the preferential subavatar assignment parameter may be revised to reflect a higher priority or to enlarge the world of possible CSR subavatar performance characteristics that may correlate to or otherwise meet said parameter, thereby improving the probability of a successful assignment at 112; or the customer may be moved up in the master queue at 116.

When an appropriate CSR subavatar is determined to be available at 112, then the customer is added to the queue for CSR subavatar at 118 and at 120 the CSR subavatar assists or otherwise engages the customer avatar (and removes the customer from its queue). If a presently assigned CSR subavatar cannot complete the present transaction at 122 (for example, a task is required that exceeds the capabilities of the present avatar, or any avatar) then the customer is reassigned at 124 to either another more-able CSR subavatar or directly to a human monitor in order to resolve the unmet need. In one example an automated CSR subavatar may formulate replies to customer questions through a look-up to a knowledge base for known or appropriate answers, wherein a human operator or customer service representative may be alerted or take over control if the customer's avatar asks to speak with a human, or if the customer appears to be unhappy, for example as determined through parsing customer text or spoken words or gestures and performing a knowledge base look-up, or if the transaction reaches a certain point (for example an endpoint is proximate), or if a human is now available.

When the transaction or interaction is deemed completed, at 126 a data trace of the transaction is created and customer historical data is responsively updated, the customer is released from the store customer queue and the customer-specific cloned avatar is deleted.

Figure 2:
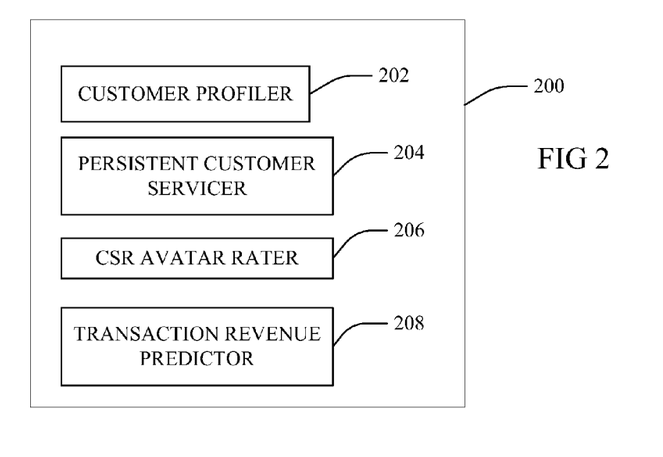
FIG. 2 is a block diagram of a load-balancing algorithmic system or process according to the present invention.

In some embodiments one or more of the process steps 102 through 126 illustrated in FIG. 1 and described above, and in particular customer profile determination and preferential CSR subavatar assignment as a function of customer profile may be accomplished through the use of one or more load-balancing and/or queuing algorithms incorporating weighting and distribution methods. FIG. 2 illustrates one example of a load-balancing algorithmic system or process 200 comprising four logic components: a customer profiler 202, a persistence system component 204, a CSR avatar or human operator ability rater 206 and a potential revenue predictor 208.

The customer profiler system 202 is configured to rate customers on buyer metrics and enable the provision of preferential customer treatment to higher priority or more profitable customers relative to lower priority customers. Such a system enables a business to maximize revenue by providing expedited service to customers more likely to complete transactions or generate higher profits, as will be appreciated to one skilled in the art of customer differentiation in retail environments. Thus, customer avatar characteristics may be observed or rated, for example behaviors relevant to a level of engagement in the VU experience. Thus, item picking-up and manipulating activities may generate higher customer priority ratings relative to customers exhibiting passive activities such as standing in the corner.

Priority ratings may be dynamically weighted or adjusted in response to real-time customer avatar behaviors, such as determined through each iteration of monitoring customer behavior at process 106 of FIG. 1. Thus, a priority rating or parameter factor may be adjusted upward for complaining customers as detected by parsing text or spoken voice customers communications. Higher priority may be given to avatars actively engaged in conversation with other customer or friend avatars, particularly when discussing a store product; to customer avatars leaving the store, with additional priority increases when the customer has not yet been assisted; or to avatars showing certain known characteristics as determined through comparison to one or more databases of known associated gestures or movements, for example characteristics associated with impatience or annoyance, or with more likely purchasing behaviors.

The customer profiler system 202 may also rate customers on avatar navigation skills; for example smooth avatar body traversals indicating a customer experienced in the VU may result in differentiated sales treatment over avatars evincing inexperienced or novice movements. An avatar's inventory may also be considered and used to establish their customer profile, for example providing priority ratings in proportion to the value of inventory items. In one embodiment, a linkage may be established between real-world and VU economic activity, for example wherein a real-world customer purchase from the store provider or other entity may automatically generate a token listed in the customer's avatar inventory available for consideration in rating the customer for service or avatar assignment differentiation.

The customer profiler system 202 may also rate customers on historical data. Thus, the previous shopping history of the customer avatar may be considered, including last total purchase amount, total amount of all previous purchases at the store, highest single transaction amount, observations from other relevant transaction histories (e.g. similar products or services purchased from competitors, etc.), amount of time customer required for help, and other useful metrics will be known and/or apparent to one skilled in the art. Data may also be retrieved or stored in an avatar Customer Relationship Management (CRM) database maintained by the VU or the store and associated with the customer avatar. As will be appreciated, any economic data deemed useful by the store operator in evaluating customer ratings may be utilized, and this data may comprise single or aggregated data.

The customer profiler system 202 may also process metrics useful for determining a relative level of establishment of the customer's avatar within the VU, such as movement history across the VU (wherein a higher number of teleports may indicate higher avatar experience and influence ratings), or avatar name search hit frequency (for example the number of times that a customer avatar name shows up as the results of a search in the VU may correspond to a level of engagement within the VU community). Other useful metrics will also be apparent to one skilled in the art.

The customer profiler system 202 may also consider customer real-life historical and contextual data. For example the real-life residence or location of the customer may be considered, with customers associated with a region having a preferred customer demographic given a higher priority over customer avatars associated with other regions though any type of geographic classification may be used. In one example, a retailer may choose to prefer the avatars of New York City residents due to a higher historical purchasing amount patterns over other avatars. Location can be determined by a variety of methods including IP address or customer self description.

Notoriety or information known about the avatar or real-life person behind the customer avatar may also be considered by the customer profiler component 202. Avatars well known within their VU sometimes acquire corresponding market-making influence among other users, and thus it may be important to treat more notorious avatars with proportionately improved care or priority to maximize their satisfaction and improve their direct or indirect marketing of the store or other positive influences on other users. Alternatively, or additionally, although some customers remain anonymous behind their avatars, some celebrities or other famous persons intentionally couple their real-life identities to their avatars, in some aspects broadcasting their presence in the VU in furtherance of real-life name and/or brand awareness building for themselves or other associated entities. For example, some political candidates and business figures have VU avatars directly tied to their real-life persona, and thus their avatar actions benefit from their real-life notoriety. Some stores may thus opt to give such real-life or VU celebrity avatars preferential treatment by assigning higher notoriety ratings in proportion to their perceived or determined notoriety, perhaps not because of an expected increased likelihood of short term economic gain through an immediate sale but instead to cultivate long term economic benefits through establishing a good relationship with the famous person, who may influence other customers in the future in a positive fashion with respect to the store.

It will also be understood that customer ratings and weightings by the customer profiler component 202 may be a function of store needs or objective: thus a store that prefers more experienced customers may proportionately or positively increase priority rating in correspondence with customer experience ratings, whereas a store that prefers customers newer to the VU may inversely proportionately or negatively apply the same customer experience ratings.

The persistence system component 204 uses historical data to match up a customer avatar with appropriate CSR subavatars. History data, such as for example sales history, may be associated with the customer avatar UUID and stored in a data store, such as for example a customer CRM. Sales history may be used to focus conversation with the customer: for a previous customer a CSR subavatar may initiate communication with "Welcome back, Steve" rather than "Welcome to my store." CSR subavatar conversation may also reflect application of recommendation logic according to sales or browsing history, including through a link to back-end recommendation systems or algorithms, in some embodiments in a fashion similar to the recommendations generated and presented to customers by some on-line retailers.

Accordingly, it is preferred to track and save every distinct interaction window between a customer avatar and a CSR subavatar and log associated data, for example as reflected by process step 126 above. Interaction data including an attending CSR subavatar when the customer last left the store and/or purchased an item may then be used to rank CSR subavatars for association with that customer, for example prioritizing CSR's subavatars they have worked with previously, in some embodiments providing additional weighting (for example favoring a CSR subavatar associated with successful purchase data or disfavoring a CSR subavatar associated with a "no-sales" transactions). By ranking CSR subavatars rather than selecting only the most preferred, some persistence system components 204 may propose the next-highest-ranked available subavatar as a function of availability.

The operator ability rater 206 is configured to select, prioritize or rank CSR subavatars as a function of subavatar or operator capabilities. Thus, a human-operator CSR subavatar whose interactions have historically resulted in more transactions may be rated as able to manage more customers than another human operator with less associated transactions. Or a CSR subavatar who has recorded more sales in a first region of a VU store than in another region may be ranked as more able to help more customers in said first store region than another subavatar. Interaction response times may be considered: thus a CSR subavatar that takes longer than others to respond to customers may be ranked accordingly, in one example as able to service a lower number of concurrent customers relative to CSR subavatars having better response times.

The potential revenue predictor 208 ranks or prioritizes customers and/or CSR subavatars as a function of revenue parameters and observations. Thus, a customer avatar in a store region containing higher profit items may have its priority or preferential rankings increased relative to customers in regions having relatively lower profit items. Or an expected time-of-service for a given customer may be determined as a function of predicted required transaction times, which may be further parsed with respect to transaction complexity (for example, providing divergent complex and simple purchase parameters and weightings). Transaction time may be determined in a number of ways, including by observing and recording the durations of previous purchasing interactions. Embodiments may also provide for additional or different functional weightings; for example giving preferential weighting to sales with a higher margin, or to items that result in more revenue, or to a mixture of revenue and margin weighting along or additional available business metrics.

FIG. 3 provides a plurality of tabular illustrations of an application of the load balancing algorithm system 200. Table A reflects customer rating generated by a customer profiler component 202 in response to customer historical data. A value of four is selected from a possible range of from one to ten in response to processing customer notoriety data, and weighted by 0.6 to generate a weighted notoriety factor of 2.4. Previous purchases data determined from economic transaction history of the customer or his avatar of between $1,000 and $5,000 results in a previous purchases rating of two which is weighted by 0.4 to generate a weighted previous purchases factor of 0.8. And the real-life location of the customer is determined to be within a first preferred region and assigned a one rating (rather than the zero assigned to other customers residing in a second non-preferred region), which is weighted by 0.2 to generate a preferred location factor of 0.2. Each of the factors is summed to arrive at a total customer historical data rating factor of 3.4.

Table B illustrates a customer profiler component 202 rating of the customer's current avatar behavior and characteristics with respect to three of the characteristics described above, which in some examples may be determined in response to monitoring the avatar at process 106 of FIG. 1. Thus, the customer's engagement in shopping is rated between one and ten as six, weighted by 0.3 to produce a weighted shopping engagement factor of 1.8. The customer avatar's smoothness of movement is rated "two" and weighted by 0.4 to produce a weighted smoothness of movement factor of 0.8. And a search of the VU for references to the avatar's name returns over fifty hits and is thus rated as three, which is weighted by 0.1 to produce a weighted avatar name search hit frequency factor of 0.3. Each of the factors is summed to arrive at a total real-time data customer rating factor of 2.9. In one embodiment the Table A historical rating factor (3.4) is added to the Table B real-time data rating factor (2.9) to generate a total customer priority rating of 6.3. In other embodiments, further weighting or balancing may be practiced: for example, one or both of the Table A historical rating factor or the Table B real-time rating factor may be further weighted prior to the combining to determine the total customer priority rating.

Table C illustrates a potential revenue predictor 208 rating of the current customer transaction; a likely dollar value of the present transaction is determined to be $20,000.00, and a transaction complexity factor of four is selected from a possible range of from one to ten. Table D illustrates the rating of a particular CSR subavatar by the CSR rater component 206. The present CSR subavatar is rated to handle a maximum of five customers at once. The maximum allowable transaction complexity factor is six; thus customers having higher complexity ratings would be assigned instead to other more able or senior CSR subavatars. The maximum customer rating is four: relatively more important customers, such as the customer rated above with a priority rating of 6.3, will not be assigned to this CSR subavatar. The CSR subavatar's historical average customer service time is four minutes: this may be considered in priority ranking for assignment to a given customer, or for eliminating some complex transaction assignments, or in other processes. And lastly the current number of customers being served by the rated CSR subavatar is monitored, presently two since this CSR subavatar is rated for a maximum of five, this CSR subavatar can accept three more new customers.

Table E reflects application of the factors and ratings of Tables A through D in evaluating a transaction and preferentially assigning a CSR subavatar to the rated customer, for example at process 112 described above. Thus, at E1 (Table E) a store provider CSR allocation application monitors each available CSR subavatar for number of currently assigned customers to ensure that they do not exceed their rated simultaneous customer limits, and at E2 (Table E) further that current customer and transaction factors do not also exceed any other applicable factor maximums.

At E3 (Table E) the allocation application determines whether any CSR subavatar's appropriate for the customer and transaction rankings are available (for example, see the process of FIG. 1 at 112 above). If not and a CSR subavatar appropriate for the customer and transaction rankings is not available before the elapse of an X minutes threshold, then the customer is assigned to a lesser-qualified CSR subavatar, thus one that may not have qualified under the current preferential CSR subavatar assignment ratings and factors prior to elapse of the threshold.

At E4 (Table E) if more than one CSR subavatar qualifies for a customer preferential subavatar assignment parameter and the present transaction ranking then a most-preferable or most appropriate one of the plurality of qualified CSR subavatar's is selected and the customer is queued to that CSR subavatar. For example, if a first available CSR subavatar is helping three high priority customers and a second CSR subavatar is helping seven low priority customers, and neither are over their rated customer limits, and a new customer is rated as a low priority customer, then the new low-priority customer is most preferably assigned to the second CSR subavatar in order to allow the first CSR to focus on the higher priority customers.

At E5 (Table E) service is rendered to the customer by a CSR subavatar and the customer is removed from the CSR subavatar's queue. And if no appropriate CSR subavatar's are available (for example, due to maximum simultaneous customer load or transaction complexity load or a combination there of), then the customer is assigned to the master queue at process 116 until either an appropriate CSR subavatar becomes available, perhaps due to re-computation of available CSR subavatar's through looping through steps 106-108-110, for example as described above. In some embodiments elapsing of a maximum master queue time causes the load-balancing algorithm to re-rate the customer for lesser-rated or formerly inappropriate CSR subavatars.

II. Computerized Implementation

Figure 4:
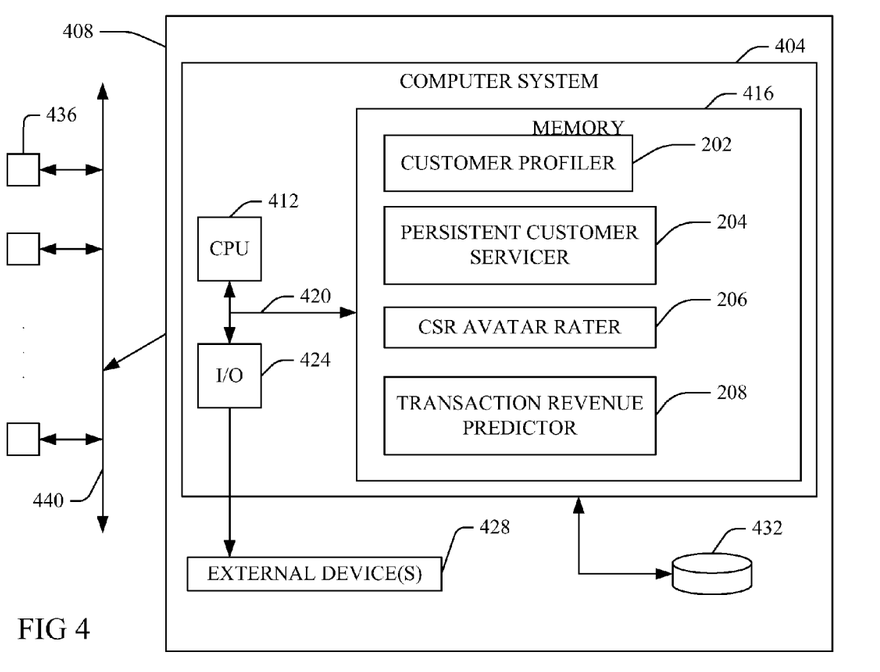
FIG. 4 is a block diagram illustrating an exemplary computerized implementation of a system and method for allocating customer service representatives in response to customer and service representative parameters according to the present invention.

The present invention may be implemented within a stand-alone VU application, or as a plug-in to an existing VU application. Referring now to FIG. 4, an exemplary computerized implementation includes a computer system 404 deployed within a computer infrastructure 408 such as a computer or a programmable device such as a personal digital assistant (PDA) or cellular phone. This is intended to demonstrate, among other things, that the present invention could be implemented within a network environment 440 (e.g., the Internet, a wide area network (WAN), a local area network (LAN), a virtual private network (VPN), etc.) in communication with one or more additional computers 436, or on a stand-alone computer infrastructure 408. In the case of the former, communication throughout the network 440 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 404 includes a central processing unit (CPU) 412, a memory 416, a bus 420, and input/output (I/O) interfaces 424. Further, the computer system 404 is shown in communication with external I/O devices/resources 428 and storage system 432. In general, the processing unit 412 executes computer program code, such as the code to implement various components of the process and system for allocating VU customer service representatives in response to customer, transaction and service representative parameters illustrated in FIGS. 1, 2 and 3 and described above, including customer profiler 202, persistence system component 204, CSR avatar or human operator ability rater 206 and potential revenue predictor 208 components discussed above, which are stored in memory 416 and/or storage system 432. It is to be appreciated that two or more, including all, of these components may be implemented as a single component.

While executing computer program code, the processing unit 412 can read and/or write data to/from the memory 416, the storage system 432, and/or the I/O interfaces 424. The bus 420 provides a communication link between each of the components in computer system 404. The external devices 428 can comprise any devices (e.g., keyboard, pointing device, display, etc.) that enable a user to interact with computer system 404 and/or any devices (e.g., network card, modem, etc.) that enable computer system 404 to communicate with one or more other computing devices.

The computer infrastructure 408 is only illustrative of various types of computer infrastructures for implementing the invention. For example, in one embodiment, computer infrastructure 408 comprises two or more computing devices (e.g., a server cluster) that communicate over a network to perform the various process steps of the invention. Moreover, computer system 404 is only representative of various possible computer systems that can include numerous combinations of hardware.

To this extent, in other embodiments, the computer system 404 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 412 may comprise a single processing unit, or be distributed across one or more processing units in one or more locations, e.g., on a client and server. Similarly, the memory 416 and/or the storage system 432 can comprise any combination of various types of data storage and/or transmission media that reside at one or more physical locations.

Further, I/O interfaces 424 can comprise any system for exchanging information with one or more of the external device 428. Still further, it is understood that one or more additional components (e.g., system software, math co-processing unit, etc.) not shown in FIG. 4 can be included in computer system 404. However, if computer system 404 comprises a handheld device or the like, it is understood that one or more of the external devices 428 (e.g., a display) and/or the storage system 432 could be contained within computer system 404, not externally as shown.

The storage system 432 can be any type of system (e.g., a database) capable of providing storage for information under the present invention. To this extent, the storage system 432 could include one or more storage devices, such as a magnetic disk drive or an optical disk drive. In another embodiment, the storage system 432 includes data distributed across, for example, a local area network (LAN), wide area network (WAN) or a storage area network (SAN) (not shown). In addition, although not shown, additional components, such as cache memory, communication systems, system software, etc., may be incorporated into computer system 404.

While shown and described herein as a method and a system, it is understood that the invention further provides various alternative embodiments. For example, in one embodiment, the invention provides a computer-readable/useable medium that includes computer program code to enable a computer infrastructure to allocate VU customer service representatives in response to customer, transaction and service representative parameters. To this extent, the computer-readable/useable medium includes program code that implements each of the various process steps of the invention.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 416 and/or the storage system 432 (e.g., a fixed disk, a read-only memory, a random access memory, a cache memory, etc.).

Still yet, computer infrastructure 408 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 408 that performs the process steps of the invention for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for allocating VU customer service representatives in response to customer, transaction and service representative parameters. In this case, a computer infrastructure, such as computer infrastructure 408, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 404, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for allocating customer service representatives in a virtual universe, the method comprising:

in response to a customer avatar entering a virtual universe store that is defined in a virtual universe and that comprises an unavailable original customer service representative avatar, cloning via a processing unit the unavailable original customer service representative avatar and assigning the clone to the customer avatar;

assigning by the processing unit a real-time experience rating value to the customer avatar as a function of observing body traversal movements of the customer avatar by:

assigning a first real-time experience rating value if the observed body traversal movements comprise picking-up or manipulating a store item; and assigning a second real-time experience rating value that is lower than the first real-time experience rating value if the observed body traversal movements do not comprise picking-up or manipulating the store item;

assigning by the processing unit a historical shopping value to the customer avatar as a function of retrieving historical customer data from a data store by:

assigning a first shopping value if the retrieved historical customer data comprises a total shopping purchase amount that meets a minimum threshold amount; and assigning a second shopping value that is lower than the first shopping value if the retrieved historical customer data comprises a total shopping purchase amount that is below the minimum threshold amount;

creating by the processing unit a customer profile value for the customer avatar as a function of adding the assigned real-time experience rating value to the assigned historical shopping value;

choosing by the processing unit a subavatar as a function of the created customer profile value by choosing a first subavatar that is controlled by a human if the created customer profile value meets a high-priority customer profile requirement threshold, and by choosing a second subavatar that is controlled by an automated artificial agent if the created customer profile value is below the high-priority customer profile requirement threshold; and populating by the processing unit the assigned clone with the chosen subavatar, wherein the populated clone engages the customer avatar.

2. The method of claim 1, wherein choosing the subavatar by the processing unit further comprises:

preferentially rating each of a plurality of subavatars comprising the first and second subavatars;

determining an appropriateness threshold as a function of the created customer profile value and an objective of the store;

determining whether at least one of the subavatars meets the appropriateness threshold and is available; and choosing a highest-rated available subavatar of the at least one available subavatars meeting the appropriateness threshold; or if no rated subavatars meet the appropriateness threshold and are available, the clone greeting the customer avatar and informing the customer avatar of a delay in service, and adding the customer to a master queue until any of the rated subavatars meet the appropriateness threshold or a revised threshold and are available.

3. The method of claim 2, further comprising:

setting by the processing unit the revised threshold to qualify an available subavatar rated below the appropriateness threshold for choosing in response to the customer residing in the master queue longer than a maximum time-in-queue time.

4. The method of claim 2, further comprising the processing unit:

setting the revised threshold by looping repetitively through the steps of observing the customer avatar behavior, retrieving historical customer data, creating the customer profile value, determining the preferential subavatar assignment parameter, and preferentially rating the subavatars;

determining the revised threshold with each loop; and choosing a highest-rated available subavatar of the at least one available subavatars meeting the revised threshold and available until at least one of the rated subavatars meets the revised threshold.

5. The method of claim 4, further comprising the processing unit:

assigning an inventory rating value to the customer avatar that is in proportion to a value item in an inventory of the customer avatar; and wherein the step of creating the customer profile value for the customer avatar is a function of adding the inventory rating value to the assigned real-time experience rating value and the assigned historical shopping value.

6. The method of claim 4, further comprising the processing unit:

assigning an establishment rating value to the customer avatar in proportion to a number of teleports of the customer avatar across the virtual universe, or to a frequency that a name of the customer avatar shows up in search results of the virtual universe; and wherein the step of creating the customer profile value for the customer avatar is a function of adding the establishment rating value to the assigned real-time experience rating value and the assigned historical shopping value.

7. The method of claim 4, further comprising the processing unit:

assigning a demographic rating value to the customer avatar by:

assigning a first demographic rating value if the customer is associated with a region having a preferred customer demographic profile; and assigning a second demographic rating value that is lower than the first demographic rating value if the customer is associated with another region that does not have a preferred customer demographic profile;

wherein the step of creating the customer profile value for the customer avatar is a function of adding the demographic rating value to the assigned real-time experience rating value and the assigned historical shopping value.

8. A method for providing a service for allocating customer service representatives in a virtual universe, the method comprising:

providing a processing unit in communication with a computer readable memory and a tangible computer-readable storage device;

wherein the processing unit, when executing program instructions stored on the tangible computer-readable storage device via the computer readable memory:

in response to a customer avatar entering a virtual universe store that is defined in a virtual universe and that comprises an unavailable original customer service representative avatar, clones the unavailable original customer service representative avatar and assigns the clone to the customer avatar;

assigns an inventory rating value to the customer avatar that is in proportion to a value item in an inventory of the customer avatar;

assigns a historical shopping value to the customer avatar as a function of retrieving historical customer data from a data store by assigning a first shopping value if the retrieved historical customer data comprises a total shopping purchase amount that meets a minimum threshold amount, and assigning a second shopping value that is lower than the first shopping value if the retrieved historical customer data comprises a total shopping purchase amount that is below the minimum threshold amount;

creates a customer profile value for the customer avatar as a function of adding the assigned inventory rating value to the assigned historical shopping value;

chooses a subavatar as a function of the created customer profile value by choosing a first subavatar that is controlled by a human if the created customer profile value meets a high-priority customer profile requirement threshold, and by choosing a second subavatar that is controlled by an automated artificial agent if the created customer profile value is below the high-priority customer profile requirement threshold; and populates the assigned clone with the chosen subavatar, wherein the populated clone engages the customer avatar.

9. The method of claim 8, wherein the processing unit, when executing program instructions stored on the tangible computer-readable storage device via the computer readable memory, chooses the subavatar by:

preferentially rating each of a plurality of subavatars comprising the first and second subavatars;

determining an appropriateness threshold as a function of the created customer profile value and an objective of the store;

determining whether at least one of the subavatars meets the appropriateness threshold and is available; and choosing a highest-rated available subavatar of the at least one available subavatars meeting the appropriateness threshold; or if no rated subavatars meet the appropriateness threshold and are available, the clone greeting the customer avatar and informing the customer avatar of a delay in service, and adding the customer to a master queue until any of the rated subavatars meet the appropriateness threshold or a revised threshold and are available.

10. The method of claim 9, wherein the processing unit, when executing program instructions stored on the tangible computer-readable storage device via the computer readable memory, further:

assigns a real-time experience rating value to the customer avatar as a function of observing body traversal movements of the customer avatar by:

assigning a first real-time experience rating value if the observed body traversal movements comprise picking-up or manipulating a store item; and assigning a second real-time experience rating value that is lower than the first real-time experience rating value if the observed body traversal movements do not comprise picking-up or manipulating the store item; and creates the customer profile value for the customer avatar by adding the assigned real-time experience rating value to the assigned inventory rating value and the assigned historical shopping value.

11. The method of claim 9, wherein the processing unit, when executing program instructions stored on the tangible computer-readable storage device via the computer readable memory, further:

assigns an establishment rating value to the customer avatar in proportion to a number of teleports of the customer avatar across the virtual universe, or to a frequency that a name of the customer avatar shows up in search results of the virtual universe; and creates the customer profile value for the customer avatar by adding the assigned establishment rating value to the assigned inventory rating value and the assigned historical shopping value.

12. The method of claim 9, wherein the processing unit, when executing program instructions stored on the tangible computer-readable storage device via the computer readable memory, further:

assigns a demographic rating value to the customer avatar by:

assigning a first demographic rating value if the customer is associated with a region having a preferred customer demographic profile; and assigning a second demographic rating value that is lower than the first demographic rating value if the customer is associated with another region that does not have a preferred customer demographic profile; and creates the customer profile value for the customer avatar by adding the assigned demographic rating value to the assigned inventory rating value and the assigned historical shopping value.

13. A system, comprising:

a processing unit in communication with a computer readable memory and a tangible computer-readable storage device;

wherein the processing unit, when executing program instructions stored on the tangible computer-readable storage device via the computer readable memory:

in response to a customer avatar entering a virtual universe store that is defined in a virtual universe and that comprises an unavailable original customer service representative avatar, clones the unavailable original customer service representative avatar and assigns the clone to the customer avatar;

assigns an establishment rating value to the customer avatar in proportion to a number of teleports of the customer avatar across the virtual universe, or to a frequency that a name of the customer avatar shows up in search results of the virtual universe;

assigns a historical shopping value to the customer avatar as a function of retrieving historical customer data from a data store by assigning a first shopping value if the retrieved historical customer data comprises a total shopping purchase amount that meets a minimum threshold amount, and assigning a second shopping value that is lower than the first shopping value if the retrieved historical customer data comprises a total shopping purchase amount that is below the minimum threshold amount;

creates a customer profile value for the customer avatar as a function of adding the assigned establishment rating value to the assigned historical shopping value;

chooses a subavatar as a function of the created customer profile value by choosing a first subavatar that is controlled by a human if the created customer profile value meets a high-priority customer profile requirement threshold, and by choosing a second subavatar that is controlled by an automated artificial agent if the created customer profile value is below the high-priority customer profile requirement threshold; and populates the assigned clone with the chosen subavatar, wherein the populated clone engages the customer avatar.

14. The system of claim 13, wherein the processing unit, when executing the program instructions stored on the computer-readable storage medium via the computer readable memory, further chooses the subavatar by:

preferentially rating each of a plurality of subavatars comprising the first and second subavatars;

determining an appropriateness threshold as a function of the created customer profile value and an objective of the store;

determining whether at least one of the subavatars meets the appropriateness threshold and is available; and choosing a highest-rated available subavatar of the at least one available subavatars meeting the appropriateness threshold; or if no rated subavatars meet the appropriateness threshold and are available, the clone greeting the customer avatar and informing the customer avatar of a delay in service, and adding the customer to a master queue until any of the rated subavatars meet the appropriateness threshold or a revised threshold and are available.

15. The system of claim 14, wherein the processing unit, when executing the program instructions stored on the computer-readable storage medium via the computer readable memory, further:

assigns a real-time experience rating value to the customer avatar as a function of parsing a real-time communication from the customer avatar by assigning a first real-time experience rating value if the parsed customer communication indicates that the customer is complaining or is actively engaged in conversation with another customer avatar discussing a product item of the store; and assigning a second real-time experience rating value that is lower than the first real-time experience rating value if the parsed customer communication does not indicate that the customer is complaining or is actively engaged in conversation with another customer avatar discussing the product item of the store; and creates the customer profile value for the customer avatar as a function of adding the assigned another real-time experience rating value to the assigned establishment rating value and the assigned historical shopping value.

16. The system of claim 14, wherein the processing unit, when executing the program instructions stored on the computer-readable storage medium via the computer readable memory, further:

assigns an inventory rating value to the customer avatar that is in proportion to a value item in an inventory of the customer avatar; and creates the customer profile value for the customer avatar as a function of adding the assigned inventory rating value to the assigned establishment rating value and the assigned historical shopping value.

17. The system of claim 14, wherein the processing unit, when executing the program instructions stored on the computer-readable storage medium via the computer readable memory, further:

assigns a demographic rating value to the customer avatar by:

assigning a first demographic rating value if the customer is associated with a region having a preferred customer demographic profile; and assigning a second demographic rating value that is lower than the first demographic rating value if the customer is associated with another region that does not have a preferred customer demographic profile; and creates the customer profile value for the customer avatar as a function of adding the assigned demographic rating value to the assigned establishment rating value and the assigned historical shopping value.

18. An article of manufacture, comprising:

a computer-readable tangible storage medium, that is not a transitory propagating signal, having computer readable program code embodied therewith, the computer readable program code comprising instructions that, when executed by a computer processing unit, cause the computer processing unit to:

in response to a customer avatar entering a virtual universe store that is defined in a virtual universe and that comprises an unavailable original customer service representative avatar, clone the unavailable original customer service representative avatar and assign the clone to the customer avatar;

assign a demographic rating value to the customer avatar by:

assigning a first demographic rating value if the customer is associated with a region having a preferred customer demographic profile; and assigning a second demographic rating value that is lower than the first demographic rating value if the customer is associated with another region that does not have a preferred customer demographic profile; assign a historical shopping value to the customer avatar as a function of retrieving historical customer data from a data store by assigning a first shopping value if the retrieved historical customer data comprises a total shopping purchase amount that meets a minimum threshold amount, and assigning a second shopping value that is lower than the first shopping value if the retrieved historical customer data comprises a total shopping purchase amount that is below the minimum threshold amount;

create a customer profile value for the customer avatar as a function of adding the assigned demographic rating value to the assigned historical shopping value;

choose a subavatar as a function of the created customer profile value by choosing a first subavatar that is controlled by a human if the created customer profile value meets a high-priority customer profile requirement threshold, and by choosing a second subavatar that is controlled by an automated artificial agent if the created customer profile value is below the high-priority customer profile requirement threshold; and populate the assigned clone with the chosen subavatar, wherein the populated clone engages the customer avatar.

19. The article of manufacture of claim 18, wherein the computer readable program code instructions, when executed by the computer processing unit, further cause the computer processing unit to choose the subavatar by:

preferentially rating each of a plurality of subavatars comprising the first and second subavatars;
determining an appropriateness threshold as a function of the created customer profile value and an objective of the store;
determining whether at least one of the subavatars meets the appropriateness threshold and is available; and
choosing a highest-rated available subavatar of the at least one available subavatars meeting the appropriateness threshold; or
if no rated subavatars meet the appropriateness threshold and are available, the clone greeting the customer avatar and informing the customer avatar of a delay in service, and adding the customer to a master queue until any of the rated subavatars meet the appropriateness threshold or a revised threshold and are available.

20. The article of manufacture of claim 19, wherein the computer readable program code instructions, when executed by the computer processing unit, further cause the computer processing unit to:
assign an inventory rating value to the customer avatar that is in proportion to a value item in an inventory of the customer avatar; and
create the customer profile value for the customer avatar as a function of adding the assigned inventory rating value to the assigned demographic rating value and the assigned historical shopping value.

21. The article of manufacture of claim 19, wherein the computer readable program code instructions, when executed by the computer processing unit, further cause the computer processing unit to:
assign a real-time experience rating value to the customer avatar as a function of observing body traversal movements of the customer avatar by:
assigning a first real-time experience rating value if the observed body traversal movements comprise picking-up or manipulating a store item; and
assigning a second real-time experience rating value that is lower than the first real-time experience rating value if the observed body traversal movements do not comprise picking-up or manipulating the store item; and
create the customer profile value for the customer avatar as a function of adding the assigned real-time experience rating value to the assigned demographic rating value and the assigned historical shopping value.

22. The article of manufacture of claim 19, wherein the computer readable program code instructions, when executed by the computer processing unit, further cause the computer processing unit to:
assign an establishment rating value to the customer avatar in proportion to a number of teleports of the customer avatar across the virtual universe, or to a frequency that a name of the customer avatar shows up in search results of the virtual universe; and
create the customer profile value for the customer avatar as a function of adding the assigned establishment rating value to the assigned demographic rating value and the assigned historical shopping value.

\* \* \* \* \*